INVENTORS
ORVILLE J. PARKS
MARTIN RONNING
BY
ATTORNEY.

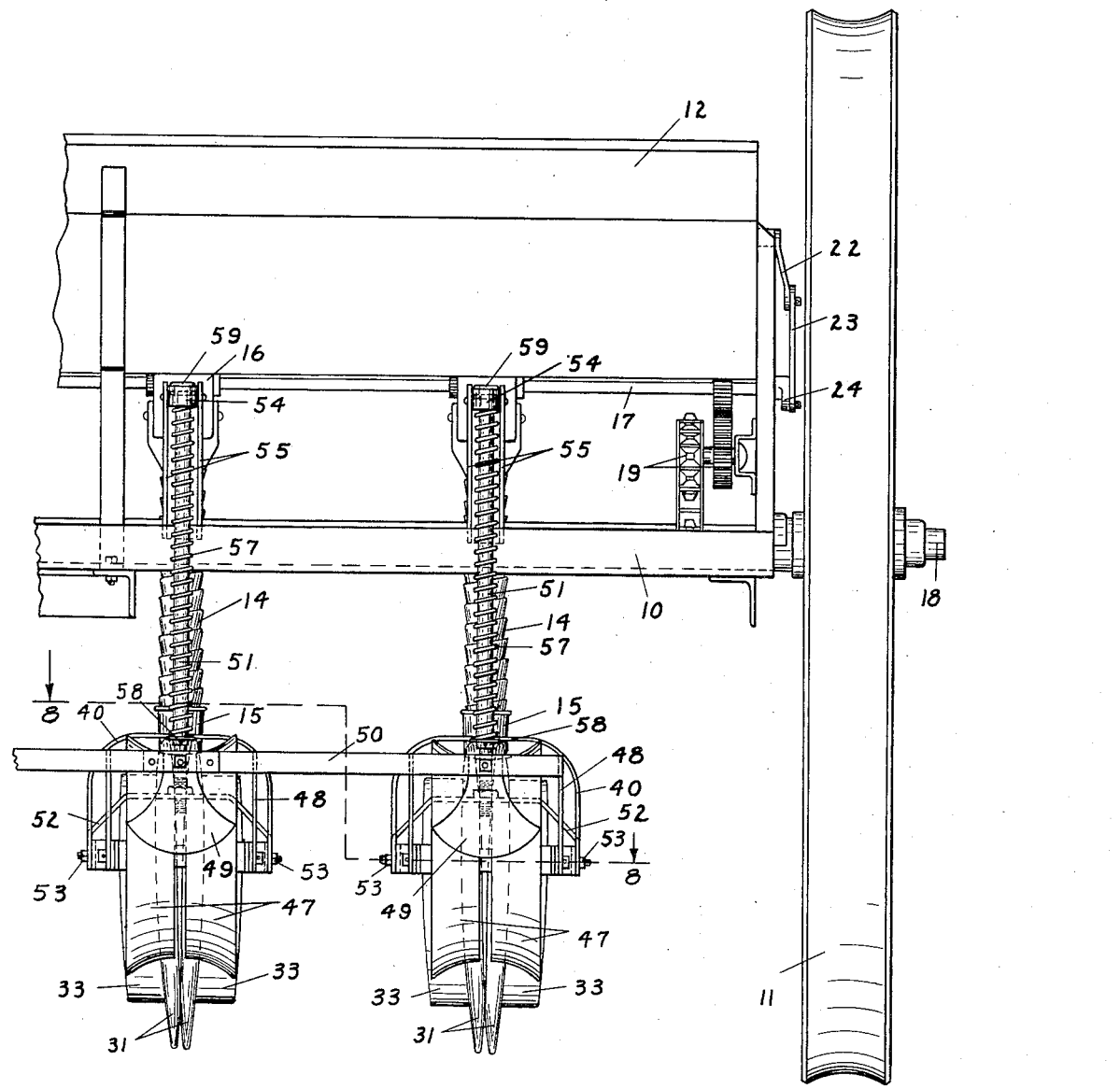

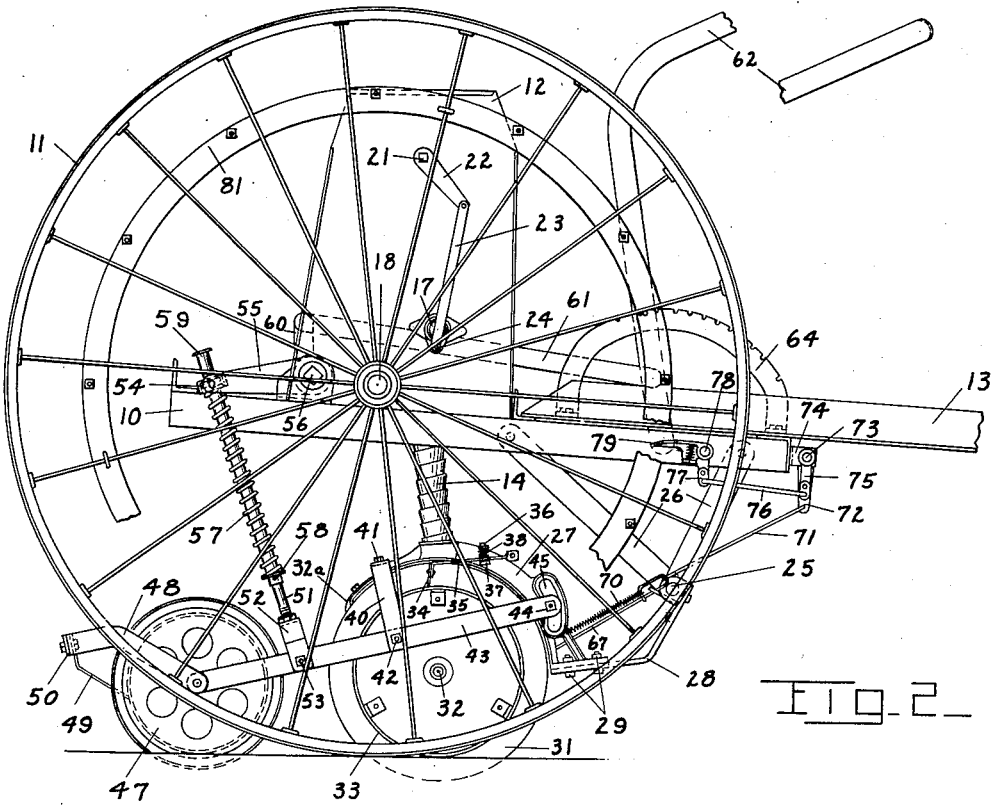
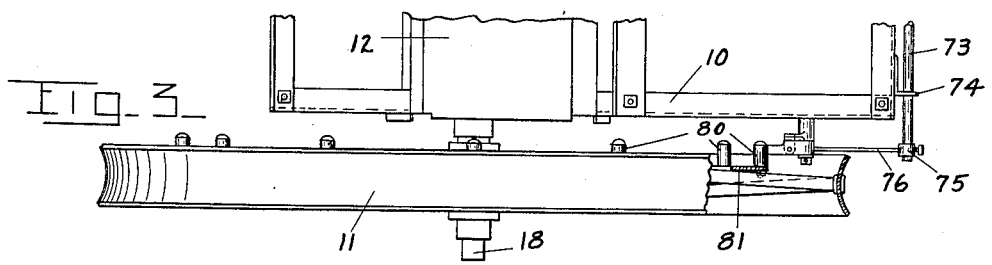
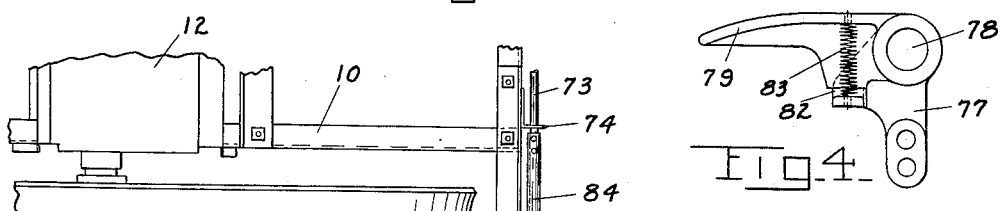
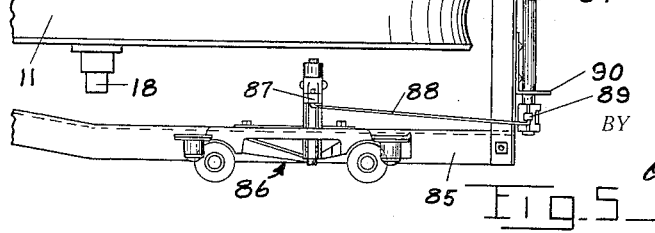
INVENTORS
ORVILLE J. PARKS
MARTIN RONNING
BY
ATTORNEY.

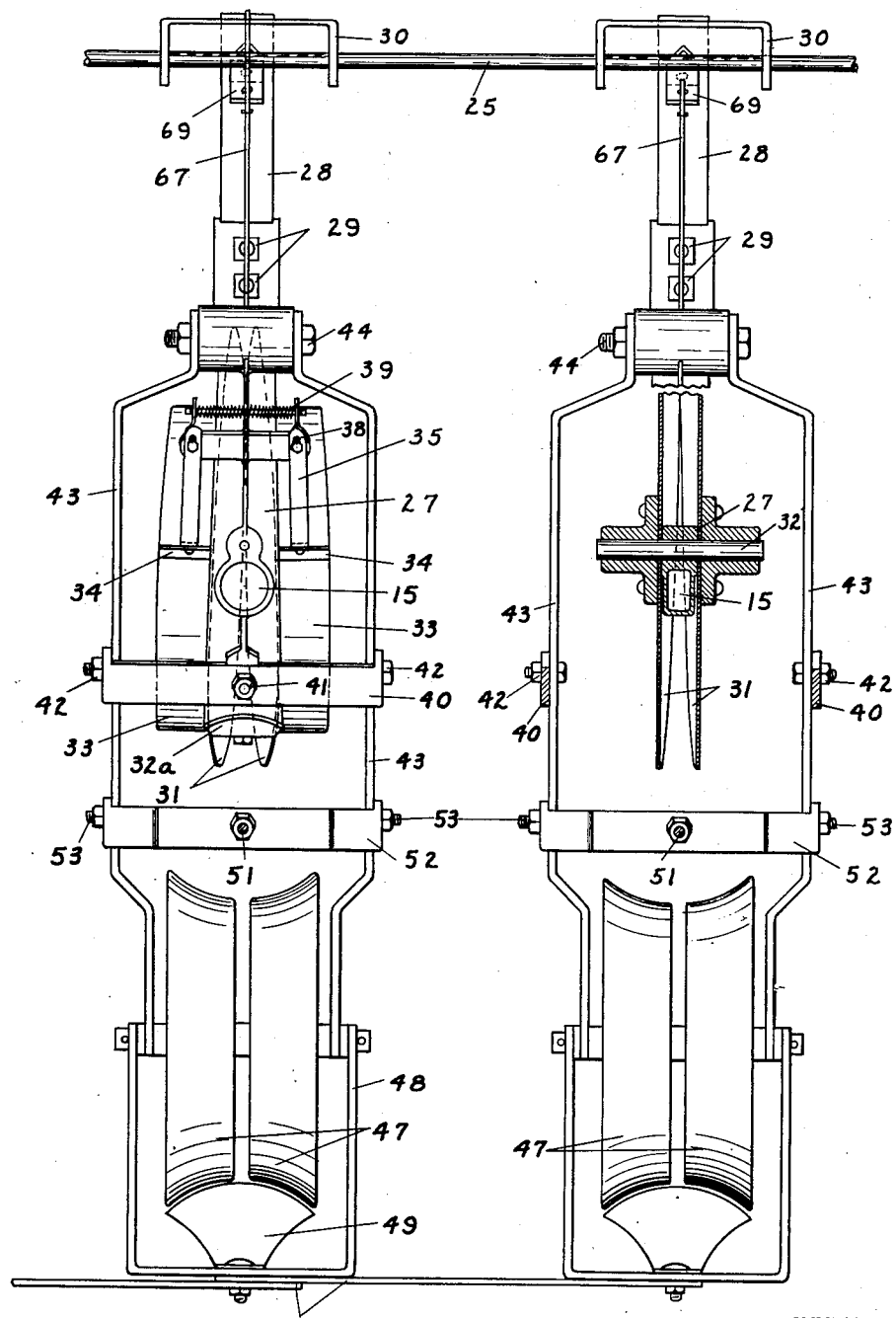

Patented Apr. 25, 1939

2,155,443

UNITED STATES PATENT OFFICE 2,155,443

PLANTER

Orville J. Parks, Hopkins, and Martin Ronning, St. Louis Park, Minn., assignors to Minneapolis-Moline Power Implement Company, Minneapolis, Minn., a corporation of Delaware Application October 31, 1936, Serial No. 108,552

9 Claims. (Cl. 111—66)

This invention relates to seed planting machinery, and the primary object is to provide a highly novel, efficient, and practical planter which is particularly designed for planting beets, beans, radishes, lettuce, and numerous other garden and farm products that are generally planted in crop rows. More particularly the object is to provide an improved planter which by suitable adjustments may be employed to selectively plant seed by any of three methods, namely, by conventional drilling, by hill dropping, and by check rowing, depending of course on the character of seed to be planted and other conditions and circumstances. A further and important object is to provide an improved and novel mechanism for controlling the intermittent feed or dropping of the seed into the ground. The invention further embraces a simple, efficient, and new construction of planter unit proper, including novel adjustable means for regulating the planting depth and furrow opening and closing members. These and still other more detailed and specific objects will be disclosed in the course of the following specification, reference being had to the accompanying drawings, wherein:

Fig. 1 is a rear elevation of the right hand end portion of a planter embodying our invention.

Fig. 2 is a side elevation of the machine, as seen from the right and with various parts broken away for purpose of illustration, the machine in this instance being equipped and adjusted for wheel actuated or hill-drop planting, and with the planter units in lowered, operating positions.

Fig. 3 is a top plan view of a portion of the machine as shown in Fig. 2, with portions broken away.

Fig. 4 is an enlarged detail elevation of the wheel trip unit as shown in Figs. 2 and 3.

Fig. 5 is a detail plan view similar to Fig. 3, but showing the machine, as equipped with supplemental apparatus to accommodate conventional check wire for check row planting.

Fig. 8 is an enlarged detail plan view of two of the planter units as employed in the machine, one of these units being shown partly in section.

Figure 6:
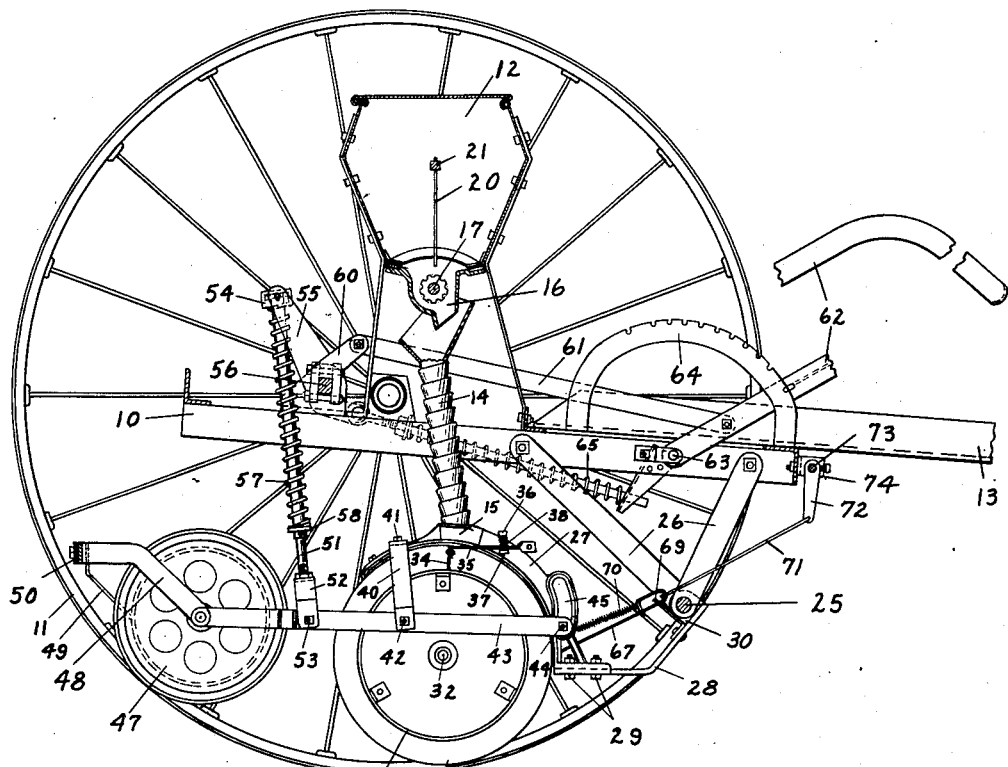
Fig. 6 is a sectional elevation through the machine showing substantially the same parts as in Fig. 2, but with the planter units lifted up into their idle or inactive positions.

Referring to the drawings more particularly and by reference characters, 10 designates the main frame of the machine which is supported on side wheels 11 and in turn supports a seed hopper 12, the frame and hopper being generally elongated, transversely, so as to accommodate a series of planter units arranged under the machine and in transversely spaced positions between the supporting wheels 11 in a conventional manner. A draft tongue or beam 13 extends forwardly from the frame for attachment to a tractor or other draft means, but forms no part of the present invention.

The planter units, presently to be described, are supplied with seed from the hopper 12 through flexible ribbon tubes 14 which direct the seed into boots 15 of the several planter units. At their upper ends the tubes 14 receive the grain or seed from feed cups 16 having feed wheels or rolls mounted on and driven by a feed shaft 17. This shaft 17 is driven from the axle, 18, of wheels 11, by gearing 19 (Fig. 1) which may be of conventional design or of constructions such as disclosed in Keith and Parks Patents No. 2,053,794 and No. 2,053,795, issued September 8, 1936. To insure proper and balanced flow of seed to the several feed cups we provide the hopper 12 with an agitator plate 20 which extends lengthwise within the hopper and is mounted on a shaft 21 journaled for oscillation in the end walls of the hopper. One end of the shaft 21 (Figs. 1 and 2) is provided with an arm 22 connected by a link 23 to a relatively short arm 24 on shaft 17, with a result that continued rotation of the shaft 17 will impart an oscillating and agitating action to the member 20.

The planter units consist of separate frame assemblies which are pivotally attached at their front ends to a cross bar 25 with freedom for vertical adjustments and movements in planes parallel with the direction of travel. The bar 25 extends transversely under the front part of frame 10, and is rigidly secured thereto by angularly disposed braces 26 (Figs. 2 and 6).

Each unit includes a casting 27, in which is formed the seed delivery boot 15, and this casting is connected to the bar 25 by a drag bar 28, secured to the casting as at 29 and having a bearing yoke 30 at its front end trunnioned on the bar 25. A pair of forwardly converging furrow opening discs 31 are rotatably secured to the casting 27, as at 32, and operate to open a furrow for the reception of seed dropping from the boot 15. A scraper blade 32ª is secured to the rear of casting 27 and operates to remove any dirt which may tend to adhere to the inner surfaces of the discs.

To the outer surfaces of the discs 31 are detachably secured circular bands 33, the peripheral surfaces of which are adapted to ride on the ground surface to limit the operating depth of the furrow opening discs. The ground engaging surfaces of these bands, as well as the adjacent outer surfaces of the discs, are scraped clean by blades 34 mounted on the ends of lever arms 35 pivoted as at 36 to a cross bar 37 of casting 27. The blade ends of the arms are held down in contact with the bands 33 by springs 38, while springs 39 act against the levers to hold the blades 34 in yielding contact with the discs.

Figure 7:
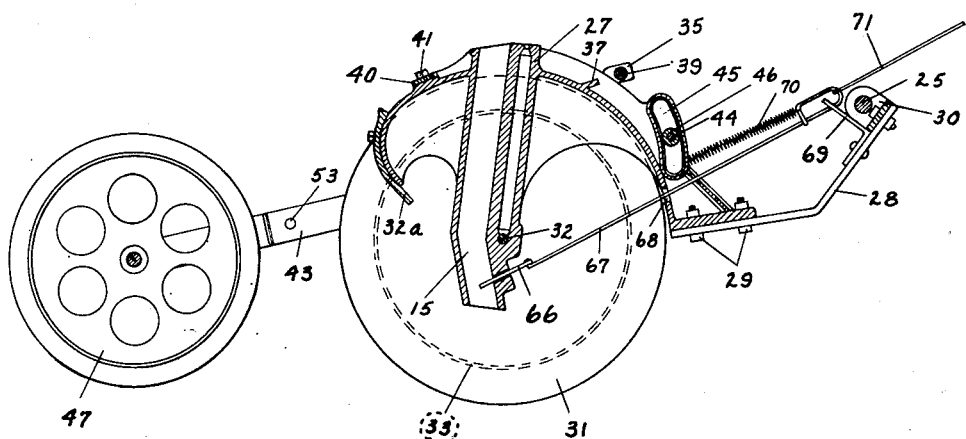
Fig. 7 is an enlarged sectional elevation through one of the planting units, with various associated parts omitted.

A bail shaped yoke 40 is secured as at 41 to the rear of the casting 27 and has depending arms which extend down laterally outside of the discs 31 and bands 33, with their lower ends pivotally connected as at 42 to a frame composed of, longitudinally extending side bars 43. The forward ends of these bars are connected by a bolt 44 which operates in an arcuate slot 45 in the forepart of the body member or casting 27. A spacer sleeve 46 (Fig. 7) is placed on the bolt within the slot so that the bolt can be tightened without causing the bars 43 to bind on the casting, and will permit the front end of the frame to have a self-adjusting or floating action limited only by the length of the slot. Under certain circumstances, as will presently be explained, it is desired to rigidly secure the front end of the bars with respect to the casting, in which event the sleeve 46 is removed, or washers may be placed on the bolt between the bars 43 and the casting, so that when the bolts are tightened they will firmly clamp the bars to the casting.

At their rear ends the bars 43 carry conventional furrow closing presser wheels 47 which travel behind the opener discs to close the furrow and cover the planted seed. A frame extension 48 extends rearwardly from each pair of bars 43 to support scrapers 49, and these extensions are preferably connected by spacer links 50 (Figs. 1 and 8) which form flexible connections between the rear ends of the planter units and permit relative vertical fluctuations as the machine operates over uneven ground.

The several planter units are suspended from and vertically controlled with respect to the main frame by bars 51, the lower ends of which have yokes 52 pivotally attached to the frames 43 as at 53. The upper ends of the bars are slidably retained in collars 54 pivoted to arms 55 of a common shaft 56 extending transversely of the machine and journaled to the main frame 10. A compression spring 57 is disposed about each bar 51 and operates between the collar 54 and a stop 58 to yieldingly press the planter unit downwardly when in operation, as indicated in Fig. 2, to thereby not only effect proper ground contact but also to permit each unit to independently ride over obstructions. It will be noted that each bar 51 has a flange or collar 59 at its upper end for stopping engagement with the collar 54 and thereby lifts the entire planter unit into inoperative position (Figs. 1 and 6) when the shaft 56 is turned to raise the arms 55. The shaft 56 is oscillated by an arm 60 connected by a link rod 61 to a hand lever 62. This lever is pivoted to the main frame as at 63 and extends sufficiently far forward so as to be within convenient reach of the operator when stationed for instance on a pulling tractor. A conventional notched segment 64 may be used to releasably secure the lever in adjusted positions. When the planter units are being carried in raised positions their weight is at least partially counterbalanced by spring units 65 (Fig. 6) to thereby relieve the strain on the lift mechanism 60—!

Attention is now directed to the automatic valve mechanism for controlling the intermittent dropping of the seeds so as to effectively and efficiently secure the desired spacing between plantings as the machine travels over the field. This mechanism includes a valve acting gate 66 (Fig. 7) which is slidable in the casting 27 to open and close the lower end of the boot 15 of each unit. The gate is operated by a rod 67 which extends forwardly between the discs 31 and through a hole 68 in the casting 27 to slidably engage and guide in a bracket 69 on the arm 28. A spring 70, connecting members 67 and 27, tends to hold the gate 66 in closed position, and of course returns it to closed position when it has been opened by a forward pull on the rod. A series of rod sections 71 connect the rods 67 to arms 72 of a shaft 73 journaled in bearings 74 on the main frame 10, with a result that when the shaft 73 is intermittently oscillated it will cause the gates 66 to open and close. It will be noted that the rods 71 and 67 of each unit are swingably connected or flexibly joined at a point adjacent the shaft 25, with a result that vertical movements of the planter units about the axis of shaft 25 will not interfere with the gate operating mechanism.

The shaft 73 is operated to intermittently open the several seed control gates 66 by either of two mechanisms selectively employed according to the type of planting which is to be done. The arrangement shown in Figs. 2, 3, and 4 is that which is used for so called hill planting where it is desired to plant the seed at regular spacings, but wherein it is not necessary that the plantings of each row correspond with the plantings of adjacent rows, as must be done where cross cultivation is to be made possible. The mechanism as here employed consists of an arm 75 depending from one end of the shaft 73, and is connected by a link 76 to an arm 77 which is pivoted to the main frame 10 as at 78. The same pivot pin supports a trigger or second arm 79 which projects rearwardly for engagement by a series of pins 80 that project inwardly from the adjacent ground wheel 11, and are preferably attached to an annular ring 81 that is secured concentrically to the wheel. The tripping mechanism is so arranged that when the trigger 79 is pushed downwardly under the forward rotation of the ground wheel, it will abut the arm 77 as at 82, and thereby push the link 76 and arm 75 rearwardly to oscillate the shaft 73. This action will in turn operate the several arms 72 to pull the rods 71 and 67 forwardly and thereby open the respective seed control gates 66 to produce the desired intermittent planting. The trip pins 80 may of course be spaced as desired so as to produce the required distance between plantings.

Although the trip members 77 and 79 move in unison under normal operating conditions, it may be noted that they are independently movable on the pivot center, and are yieldingly held together by a spring 83 which, however, will permit the trigger arm 79 to move upwardly without correspondingly moving the arm 77. The purpose of this arrangement is to prevent breakage and permit the pins 80 to move upwardly under the members 79, when the machine is inadvertently or otherwise moved in a rearward direction.

When the machine is to be used for check row planting, the trigger mechanism 76–79 is removed or disconnected from shaft 73, and in place thereof we apply to one end of the shaft 73 an extension 84, as shown in Fig. 5. In this event also it is necessary to provide a main frame extension 85 which preferably projects laterally beyond the wheel 11 to support a tripping unit generally designated by the numeral 86. This unit may be of any conventional type such as generally employed in planting of corn or other row crop where cross cultivation is desired, and is intermittently operated by a wire (not shown) which is stretched across the field parallel with the direction of travel. As the stops on the wire pass into engagement with the tripping unit 86 they will, in the present instance, actuate an arm 87 rearwardly. And as this arm is connected by a rod 88 to a similar arm 89 on the shaft extension 84, a pull on the rod 88 will have the same effect on the shaft 73 as the pushing action of the previously described rod 76. The shaft extension 84 is preferably journaled in a bearing bracket 90 on the frame extension 85, and may be easily disconnected from the shaft 73 when the frame extension is removed from the main frame 10. From the foregoing an understanding of the two methods of seed planting control will no doubt be obvious.

With further reference to the operation of the machine insofar as it relates to the control of the planter units, other than the seed feed control, attention is directed to the fact that under normal operating conditions pressure will be applied by the springs 57 downwardly to the frame 43 at the point of pivot connections 53. As long as the bolts 44 are free to float in the notches 45, the downward pressure of the springs 57 will be distributed forwardly to the yokes 40, thus creating a downward pressure on the discs 31 and rearwardly to the furrow closing wheels 47; and this pressure will be substantially equalized between the furrow opening and closing devices. Furthermore, the operating depth of the discs 31 will be controlled by the flanges 33 traveling on the ground surface, but will be free for self-adjusting movement when traveling over irregularities of the ground surface; but this floating or self-adjusting action of the discs will not correspondingly raise or lower the furrow coverer 47, as it too will be free to adjust itself to ground surface irregularities. The freedom of movement of the bolt 44 in the slot 45 will permit this individual self-adjusting action to both units 31 and 47.

Under certain operating conditions, and particularly when the earth is hard and rough, it is found advantageous to apply stronger downward pressure and to control the working depth of the discs 31 in a different manner. This is done by rigidly securing the frame bars 43 to the casting 27, either by removing the spacer sleeve 46 or by inserting washers, as previously noted, so that the bolt 44 may be employed to lock the front end of the frame 43 with respect to the forward portion of the casting 27. This will of course eliminate any pivoting action at the point 42, and the entire frame, including the casting 27 and bars 43, can then only swing in a vertical plane on the shaft 25. With this arrangement the depth bands 33 are removed from the discs 31, and the wheels 47 become the depth adjusting elements. In this instance the operating depth of the opener discs 31 may be adjusted by regulating the vertical position of the bolt 44 in the slot 45, as such adjustment will determine the relative elevations of the members 31 and 47 of each planter unit.

It is understood that suitable modifications may be made in the structure as disclosed, provided such modifications come within the spirit and scope of the appended claims. Having now therefore fully illustrated and described our invention, what we claim to be new and desire to protect by Letters Patent is:

1. In a planting machine, including a frame, a planter unit attached at its frontal extremity to a drag bar forwardly extended and pivotally connected to the frame for vertical movement, the said planter unit having a vertically elongated slot in its frontal portion, a covering wheel assembly disposed rearwardly of the planter unit, a bar member pivotally supporting the covering wheel assembly and extended forwardly into slidable aand pivotal engagement with the said slot in the planter unit, the said bar member being also pivoted to the planter unit at the rear portion thereof, and means pivotally connected to the bar member rearwardly of the planter unit for applying yielding downward pressure to the bar member.

2. In a planting machine, including a frame, a planter unit pivotally supported by its frontal extremity from the frame for movement in a vertical plane, a coverer unit, a frame device supporting the coverer unit rearwardly of the planter unit, the said frame device being fulcrumed on the planter unit at the rear portion thereof and extended forwardly therefrom into slidable and pivotal engagement with the planter unit at its frontal portion and means for applying yielding downward pressure on the frame device rearwardly of its fulcrum point.

3. In a planting machine including a frame, a planter unit pivotally supported at its frontal extremity from the frame for movement in a vertical plane, the said planter unit having a vertically elongated slot in its frontal portion, a coverer unit disposed rearwardly of the planter unit, a frame device connecting the coverer unit and planter unit and being pivotally connected to the rear portion of the latter, the said frame device being extended forwardly from the said pivotal connection and having slidable and pivotal engagement in the said slot in the planter unit, and means for applying a yielding downward pressure on the frame device rearwardly of its pivotal connection with the planter unit.

4. In a planting machine including a frame, a planter unit pivotally supported at its frontal extremity from the frame for movement in a vertical plane, the said planter unit including rotatable ground engaging and depth limiting elements, and the planter unit having a vertically elongated slot in its frontal portion, a covering wheel disposed rearwardly of the planter unit, a bar member pivotally connected to the covering wheel at one end and extended forwardly therefrom into slidable and pivotal engagement with the slot in the planter unit, the said bar member being also pivotally supported from the rear portion of the planter unit, and means for applying resilient downward pressure on the bar member rearwardly of the planter unit.

5. A planting machine comprising a main frame, a drag bar pivotally supported from the main frame, a planting unit attached to the drag bar for vertical movement therewith, the said planting unit having a vertically elongated slot in its frontal portion, a bail member secured to the rear portion of the planting unit, side bars pivotally connected to the bail member and extending forwardly and rearwardly therefrom, a pivot member connecting the frontal ends of the side bars and slidably extended through the said slot in the planter unit, a coverer unit mounted at the rear ends of the side bars, and means for exerting a yielding downward pressure on the side bars rearwardly of their pivotal connection to the said bail member.

6. A planting machine comprising a main frame, a drag bar pivotally supported from the main frame, a planting unit attached to the drag bar for vertical movement therewith, the said planting unit having a vertically elongated slot in its frontal portion, a bail member secured to the rear portion of the planting unit, side bars pivotally connected to the bail member and extending forwardly and rearwardly therefrom, a pivot member connecting the frontal ends of the side bars and slidably extended through the said slot in the planter unit, a coverer unit mounted at the rear ends of the side bars, and means for exerting yielding downward pressure on the side bars between the said bail member and the coverer unit.

7. A planting machine comprising a main frame, a drag bar pivotally supported from the main frame, a planting unit attached to the drag bar for vertical movement therewith, the said planting unit having a vertically elongated slot in its frontal portion, a bail member secured to the rear portion of the planting unit, side bars pivotally connected to the bail member and extending forwardly and rearwardly therefrom, a pivot member connecting the frontal ends of the side bars and slidably extended through the said slot in the planter unit, a coverer unit mounted at the rear ends of the side bars, means for applying yielding downward pressure to the side bars rearwardly of the bail member, and means for securing the frontal ends of the side bars in adjusted position in the slot in the planter unit.

8. A planting machine comprising a pivotally supported drag bar, a planter unit attached to the drag bar and having a vertically elongated slot in its frontal portion, a bail member secured to the rear portion of the planter unit and extended laterally in spaced relation therefrom, side bars pivotally supported from the bail member and extended forwardly therefrom, means pivotally connecting the side bars and extending slidably in the slot in the planter unit, furrow opening means in the planter unit, depth limiting means on the said furrow opening means, a covering unit supported by the side bars rearwardly of the planter unit, and means for exerting a yielding downward pressure on the side bars between the planter and coverer units.

9. A planting machine comprising a pivotally supported drag bar, a planter unit attached to the drag bar and having a vertically elongated slot in its frontal portion, a bail member secured to the rear portion of the planter unit and extended laterally in spaced relation therefrom, side bars pivotally supported from the bail member and extended forwardly therefrom, means pivotally connecting the side bars and extending slidably in the slot in the planter unit, furrow opening means in the planter unit disposed inwardly of the side bars, detachable depth limiting means on the said furrow opening means, a covering unit supported by the side bars rearwardly of the planter unit, and means for exerting a yielding downward pressure on the side bars between the planter and coverer units.

ORVILLE J. PARKS.
MARTIN RONNING.